United States Patent [19]

Mirkin et al.

[11] Patent Number: 5,286,571
[45] Date of Patent: Feb. 15, 1994

[54] MOLECULAR MODIFICATION REAGENT AND METHOD TO FUNCTIONALIZE OXIDE SURFACES

[75] Inventors: Chad A. Mirkin, Skokie; Kaimin Chen, Chicago, both of Ill.

[73] Assignee: Northwestern University, Evanston, Ill.

[21] Appl. No.: 933,260

[22] Filed: Aug. 21, 1992

[51] Int. Cl.$^5$ .............................................. B32B 17/06
[52] U.S. Cl. .................................... 428/428; 428/405; 428/406; 428/410; 428/429; 428/446; 428/447; 429/212; 429/218
[58] Field of Search ............... 428/410, 428, 429, 446, 428/447, 405, 406; 429/212, 218; 106/287.1, 287.13; 65/60.1, 60.3, 60.52, 60.8; 427/126.2, 126.3, 126.6

[56] References Cited

U.S. PATENT DOCUMENTS

| | | | |
|---|---|---|---|
| 4,198,467 | 4/1980 | Reade | 428/410 |
| 4,761,316 | 8/1988 | Ogawa | 428/447 |
| 4,835,269 | 5/1989 | Kohavec et al. | 544/69 |
| 4,992,300 | 2/1991 | Ogawa | 428/447 |
| 5,057,339 | 10/1991 | Ogawa | 428/447 |
| 5,130,189 | 7/1992 | Hart | 428/331 |

OTHER PUBLICATIONS

Nuzzo, et al. "Fundamental Studies of Microscopic Wetting on Organic Surfaces, 1, Formation and Structural Characterization of a Self-Consistent Series of Polyfunctional Organic Monolayers" J. Amer. Chem. Soc. 112:558-69 (1990).
Porter, et al. "Spontaneously Organized Molecular Assemblies. 4. Structural Characterization of n-Alkyl Thiol Monolayers on Gold by Optical Ellipsometry, Infrared Spectroscopy, and Electrochemistry" J. Amer. Chem. Soc. 109:3359-68 (1987).
Rubenstein, et al. "Ionic Recognition and Selective Response in Self-Assembling Monolayer Membranes on Electrodes" Nature 332: 426-429 (1988).
Little, et al. "Amides of Ferrocenemonocarboxylic Acid. A Convenient Method for Preparing Ferrocenemonocarboxylic Acid and Heteroannular Substituted Derivatives" J. Amer. Chem. Soc. 82:1577-80 (1960).
Little, et al. "Ferrocenylazobenzenes. Resonance Interaction of Ferrocene with Substrates" Organic Chemistry 25:1979-82 (1960).
Mirkin, et al. "Chemically Sensitive Microelectrochemical Devices: New Approaches to Sensors" Amer. Chem. Soc. 17:218-36 (1992).
Hickman, et al. "Selective Functionalization of Gold Microstructures Ferrocenyl Derivatives via Reaction with Thiols or Disulfides: Characterization by Electrochemistry and Auger Electron Spectroscopy" J. Amer. Chem. Soc. 113:1128-32 (1991).
Chalk, et al. "Reactions Between Dicobalt Octacarbonyl and Silicon Hydrides" J. Amer. Chem. Soc. 87:1133-35 (1965).
Chidsey, et al. "Molecular Order at the Surface of an Organic Monolayer Studies by Low Energy Helium Diffraction" J. Chem. Phys. 91:4421-23 (1989).
Finklea, et al. "Passivation of Pinholes in Octadecanethiol Monolayers on Gold Electrodes by Electrochemical Polymerization of Phenol" Langmuir 6:371-76 (1990).
Baay, et al. "Trimethyl-and Trichlorosilylcobalt Tetracarbonyls and the Hydrosilation of Ethylene" Inorganic Chemistry 8:986-994 (1969).

(List continued on next page.)

Primary Examiner—Ellis P. Robinson
Assistant Examiner—Timothy M. Speer
Attorney, Agent, or Firm—Tilton, Fallon, Lungmus & Chestnut

[57] ABSTRACT

This invention relates to a molecular modification reagent consisting of an inorganic oxide substrate having surface oxygens bonded to silylcobalt tetracarbonyl groups. This reagent is functionalized to form new compounds useful e.g., in semi-conductor industry, sensor industry, chromatography and modified support industry, and in the isolation of biologically active molecules.

3 Claims, 2 Drawing Sheets

OTHER PUBLICATIONS

Bain, et al. "Formation of Monolayer Films by the Spontaneous Assembly of Organic Thiols from Solution onto Gold" J. Amer. Chem. Soc. III:321–335 (1989).

Bain, et al. "Formation of Monolayers by the Coadsorption of Thiols on Gold: Variation in the Head Group, Tail Group, and Solvent" J. Amer. Chem. Soc. III:7155–64 (1989).

Strong, et al. "Structures of Self-Assembled Monolayer Films of Organosulfur Compounds Absorbed on Gold Single Crystals: Electron Diffraction Studies" Langmuir 4:546–58 (1988).

Wrighton, et al. "Preparation of Chemically Derivatized Platinum and Gold Electrode Surfaces, Synthesis, Characterization, and Surface Attachment of Trichlorosilylferrocene, (1,1'-Ferrocenediyl)dichlorosilane, and 1,1'-bix(triethoxysilyl)ferrocene" J. Amer. Chem. Soc. 100:7264–71 (1978).

"Dicobalt Octocarbonyl as a Catalyst . . . ", Harrod, Chalk, JACS, 87, 1133, 1965.

"Covalently attached Organic Monolayers on Semicon. Surfaces", Haller, JACS, 100:26, 8050–55, 1978.

"Preparation of Chem. Derivatized Platinum and Gold Electrode Surfaces", Wrighton, JACS, 100:23,7264, 1978.

"Covalent Attachment of Arenes to $SnO_2$-semiconductor electrodes", Fox, JACS, 102:12, 4029–36, 1980.

MOLECULAR MODIFICATION REAGENT AND METHOD TO FUNCTIONALIZE OXIDE SURFACES

This invention was made with Government support under Grant Number: CHE-9121589 awarded by National Science Foundation. The Government has certain rights in the invention.

FIELD OF THE INVENTION

This invention relates to cobalt carbonyl mediated modification of oxide surfaces. The new materials are oxides having surface oxygens bonded to silylcobalt tetracarbonyl groups. These new materials may be functionalized with molecules possessing alcohol, amine, thiol, amide or carboxylic acid groups.

DESCRIPTION OF THE PRIOR ART

Over the past two decades there has been a great deal of interest in the modification of electrode surfaces for potential use in device technology dealing with nonlinear optics, sensors, molecular electronics and microphotolithography. The chlorosilyl ($Cl_xSi$-) and alkoxysilyl (($RO)_xSi$-) functionalities have become universal groups for the molecular self-assembly of reagents onto oxide surfaces.

Modification reagents with these functionalities are proposed to undergo condensation reactions with surface —OH or —O$^-$ sites to anchor the reagent through strong, covalent Si-O bond(s). The chlorosilyl and alkoxysilyl functional groups have some inherent drawbacks with respect to surface modification; besides being difficult to work with, the silyl functionalities are often incompatible with the surface modification reagents of interest. Those compounds that may be synthesized with the silyl functionalities are often times difficult to isolate due to condensation reactions with trace amounts of $H_2O$. Fischer, et al., *J. Am. Chem. Soc.* 101:7863 (1979); Wrighton, et al., *J. Am. Chem. Soc.* 100:7264 (1978). Other workers have avoided synthesizing silyl functionalized modification reagents by prior modification of the surface with a molecule possessing organic functionality that lends itself to further modification. Haller, I., *J. Amer. Chem. Soc.* 100:8050 (1978); Fox, M.A., et al., *J. Amer. Chem. Soc.* 102:4029 (1980). This prelayer, which is typically a silyl reagent itself, allows for the modification of surfaces using organic methodologies.

$(CH_3)_3SiCo(CO_4)$ was shown to react with alcohols (R—OH) and amines (R—$NH_2$) in solution to form $(CH_3)_3SiOR$ and $(CH_3)_3SiNHR$ compounds, respectively. Baay, et al., Trimethy- and Trichlorosilylcobalt Tetracarbonyls and the Hydrosilation of Ethylene, *Inorgan. Chem.* 8:986, 991 (1969). The applicants have explored the reactivity of $Cl_3SiCo(CO)_4$ with oxide surfaces. $Cl_3SiCo(CO)_4$ has Si-Cl and Si-Co bonds that are susceptible with reaction with OH functionality. This compound, thus, might also be expected to react with surface —OH sites on oxide surfaces such as ITO (indium-tin-oxide), alumina ($Al_2O_3$) and silica ($SiO_2$); although surface OH sites may react with a Si-Cl bond or a Si-Co bond of $Cl_{3-x}(CH_3)_xSiCo(CO)_4$, the applicants found that the reaction involving Si-Cl bond is favored. This chemistry allowed for the preparation of a silylcobalt alkyl carbonyl material that can be modified with a variety of functional groups.

SUMMARY OF THE INVENTION

The present invention provides a molecular modification reagent comprising an oxide surface modified with silicon cobalt tetracarbonyl. This new material can be modified with a wide range of molecules possessing specific organic functional groups. The present invention provides a method to modify oxide surfaces with a silylcobalt alkyl carbonyl compound and to further react the modified oxide surfaces to attach various functional groups.

More specifically this invention provides a molecular modification reagent. This reagent is an inorganic oxide substrate having surface oxygens bonded to silylcobalt tetracarbonyl groups. This compound can be reacted with functionalized reagents, i.e. any molecules possessing SH, $NH_2$, OH, $CO_2H$ or $CONH_2$ functionality.

This invention also provides a method to functionalize an inorganic oxide substrate. This method involves providing a solid inorganic oxide having a surface monolayer of hydroxyl or oxo groups; reacting said inorganic oxide with a compound of the formula:

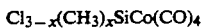

wherein x is 0, 1, or 2 to form an inorganic oxide having surface oxygens bonded to silylcobalt tetracarbonyl groups, reacting said silylcobalt containing compound with molecules possessing alcohol, amine, thiol, amide and carboxylic acid moieties to functionalize said inorganic oxides.

More particularly, this invention provides a method to functionalize an inorganic oxide. This method involves providing a solid inorganic oxide having a surface monolayer of hydroxyl or oxo groups; reacting said inorganic oxide with a compound of the formula:

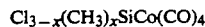

x is 0, 1, or 2 to form an inorganic oxide having surface bonded to silylcobalt tetracarbonyl groups; reacting said silylcobalt containing compound with HX wherein X is selected from the group consisting of:
—$OCH_2Fc$, —p—($NHC_6H_4$)Fc, —$S(CH_2)_{10}C(O)Fc$, —OC(O)Fc, p—Ph—N=N—Ph—$(CH_2)_4OH$,
p—Ph—N=N—Ph—$(CH_2)_4SH$,
p,p—FcPh—N=N—Ph$(CH_2)_4OH$,+
p,p—FcPh—N=N—Ph—$(CH_2)_4SH$ and —NHC(O)Fc to form a functionalized inorganic oxide.

CO)₄ species. Second scan resembles the response observed for an unmodified ITO electrode.

DETAILED DESCRIPTION OF THE INVENTION

The present invention provides an inorganic oxide or like compounds having surface oxygens bonded to silylcobalt tetracarbonyl groups. The substrates contemplated by this invention include: indium-tin-oxide substrates (ITO) $SiO_2$, $TiO_2$, $Al_2O_3$, $PtO_x$, $RuO_2$, $SnO_2$, $GeO_2$, AuO, and NiO, quartz, glass or oxidized silicon wafers or like oxides and organic polymers with alcohol functionality for example polyvinylalcohol. The modified oxide surface includes between one to three oxygens bonded to silane. The surface most likely contains a distribution in which all forms of bonding are present.

The substrate is reacted with a compound of the formula $Cl_{3-x}(CH_3)_xSiCo(CO)_4$ wherein x is 0, 1, or 2. In the preferred embodiment the reagent is $Cl_3SiCo(CO)_4$. This modified inorganic oxide can be functionalized with a variety of groups, such as alcohol amine, thiol, amide and carboxylic acid moieties. More specifically, the modified inorganic substrate can be functionalized with for example: chemically sensitive reagents, chiral reagents or redox reagents. With respect to chiral reagents, these compounds can be affixed to a column for chromatographic separation of enantiomers and biologically active molecules. Additionally, semi-conductors can be modified with redox active molecules. Redox active molecules are those molecules which electrons may be reversibly added or removed.

Figure 1:
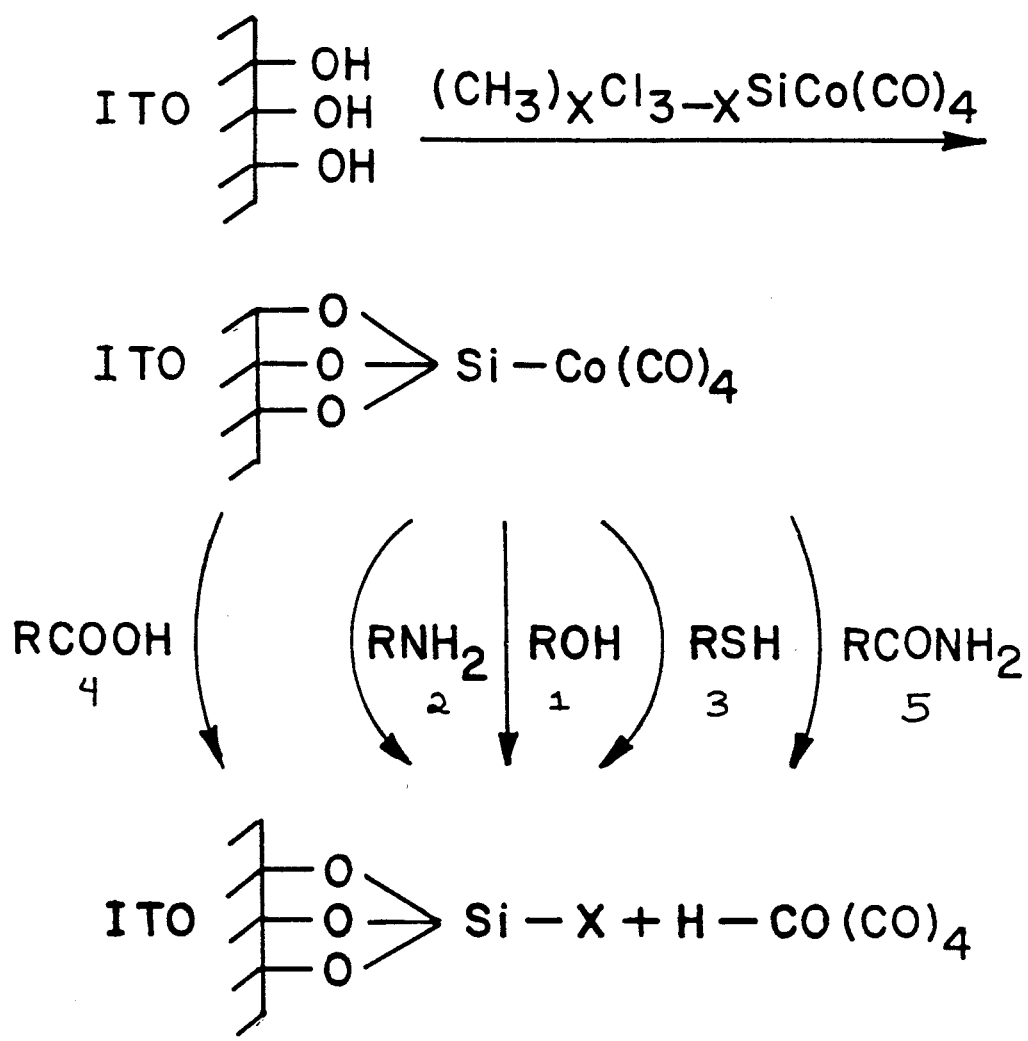
FIG. 1 is a schematic diagram of cobalt mediated self-assembly of redox-active alcohols, amines, thiols, carboxylic acid and amides on indium-tin-oxide substrate.

The results reported herein outline a new and general transition metal-mediated method for the modification of oxide surfaces with redox active molecules. Oxide surfaces pretreated with a monolayer of $Cl_{3-x}(CH_3)_xSiCo(CO)_4$ yield a surface susceptible to metathesis with NH, SH, and OH functionalities. See FIG. 1. Other workers have shown that $(CH_3)_3SiCo(CO)_4$ reagent react with alcohols and amines in metathesis fashion to form $(CH_3)_3Si$-OR and $(CH_3)_3Si$-NHR reactions 1 and 2 respectively, a) Baay, Y. L, et al., Inorg. Chem. 8:896 (1969); b) Chalk, A. J., et al. J. Amer. Chem. Soc. 87:1133 (1965). In a typical experiment, an ITO electrode is soaked in a 0.5M KOH solution

(1)

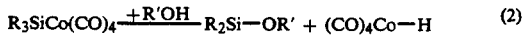

(2)

(EtOH/H₂O) for 1 hour and rinsed with hot distilled water and ethanol, respectively, and dried under vacuum. The ITO electrode is then soaked in a 0.01M toluene solution of $Cl_3SiCo(CO)_4$ for 24 hour at 22° C. under a N₂ atmosphere. Subsequent treatment of the $SiCo(CO)_4$ modified ITO with a 0.01M acetonitrile solution of any one of the redox active surface modification reagents 1-5 (See Table 1) leads to efficient molecular self-assembly onto the ITO electrode surface. Compounds 1 and 4 are commercially available (Aldrich). Compounds 2, 3, and 5 were synthesized according to literature methods. 2: Little, et al., Org. Chem. 25:1979 (1960); 3: Hickman, J. J., et al., J. Amer. Chem. Soc. 113:1128 (1991); 5: Little, W. F., et al., J. Amer. Chem. Soc. 82:1577 (1960) (hereby incorporated by reference).

TABLE 1

| | |
|---|---|
| 1, HX, X = | —OCH₂Fc |
| 2, HX, X = | -p-(NHC₆H₄)Fc |
| 3, HX, X = | —S(CH₂)₁₀C(O)Fc |
| 4, HX, X = | —OC(O)Fc |
| 5, HX, X = | —NHC(O)Fc |

Figure 2A:
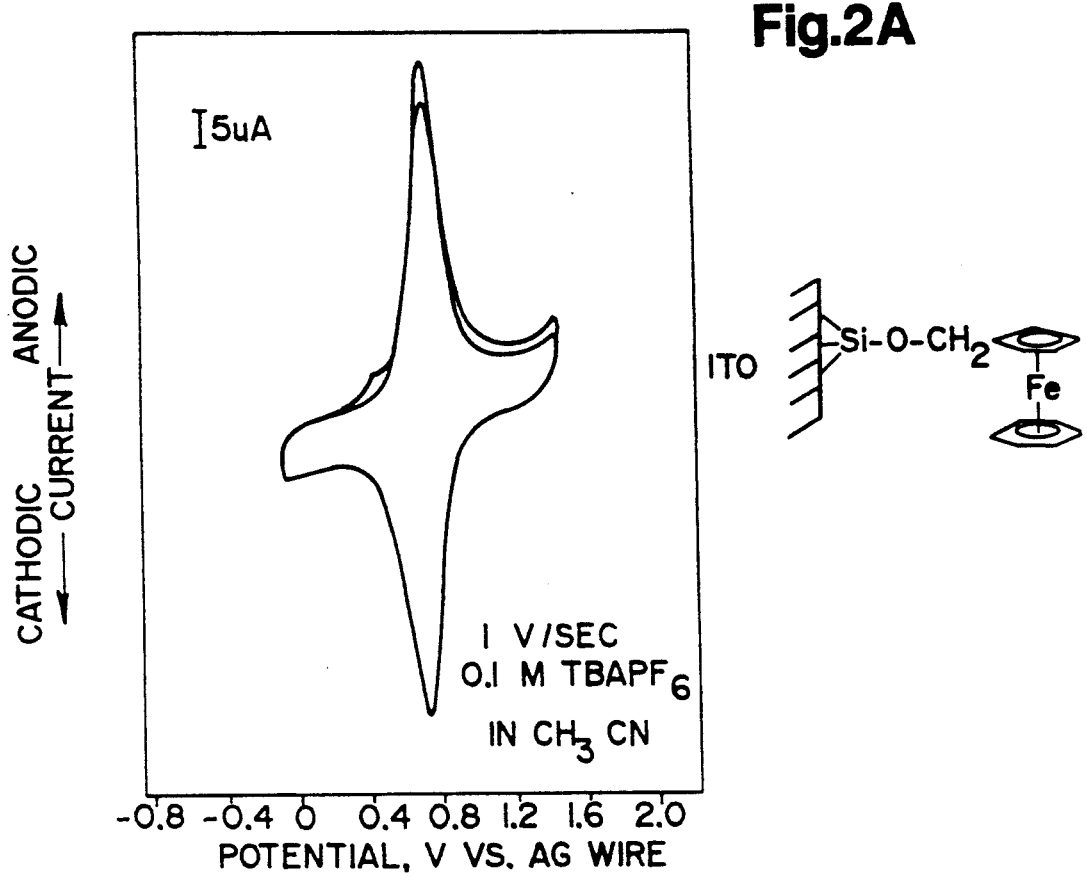
FIG. 2A shows results of cyclic voltammetry for a redox modified substrate. Cyclic voltammetry of a $(Cl)_3SiCo(CO)_4$ modified ITO electrode (0.5 cm$^2$) after soaking in a 0.01M toluene solution of ferrocenyl methanol for 48 hour. The first scan shows two surface species $SiCo(CO)_4$ (irreversible wave at less positive potential) and ferrocenyl methanol (reversible wave at more positive potential). The second scan shows only one reversible wave for the ferrocenyl methanol.

FIG. 2A shows the cyclic voltammetry of a $SiCo(CO)_4$ modified ITO electrode (0.5 cm²) after soaking in a 0.01M solution of ferrocenyl methanol for 48 h at 22° C. On the first scan two oxidation waves are observed, one large electrochemically reversible wave ($E_{1/2}$ =0.64 V vs. Ag) due to the adsorption of the ferrocenyl methanol and one considerably smaller irreversible wave ($E_{pa}$=0.34 V vs. Ag) which we assign to unreacted $SiCo(CO)_4$ sites. On the second and subsequent scans one persistent, electrochemically reversible wave for the ferrocenyl methanol is observed with an electrochemical response consistent with approximately one monolayer of molecules (6 × 10¹³ molecules/cm²), FIG. 2A.

Figure 2B:
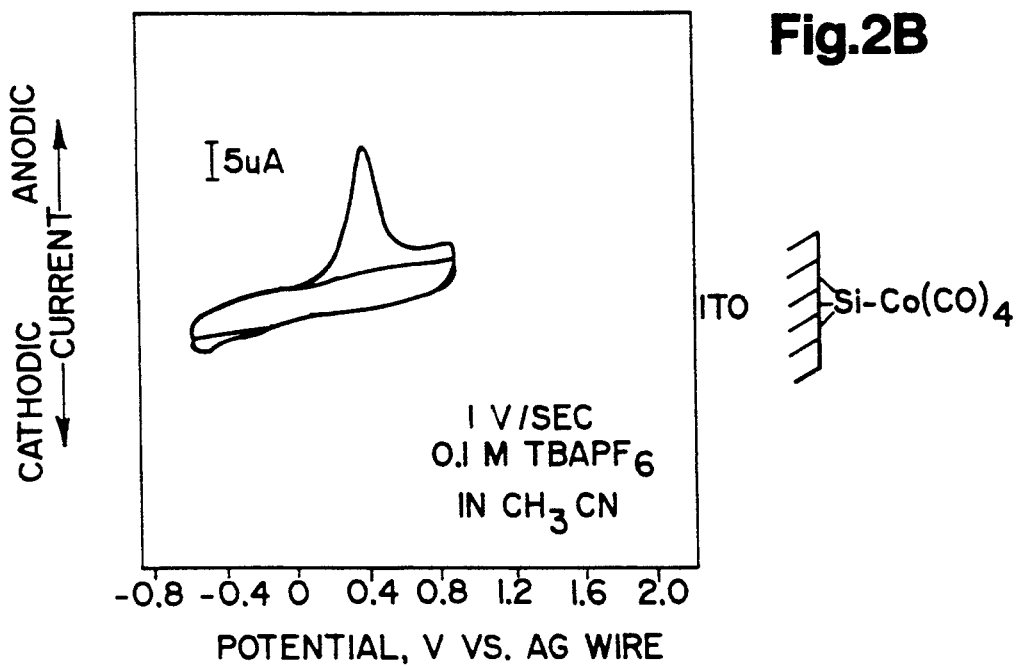
FIG. 2B shows the electrochemical response of an ITO electrode modified with $Cl_2(CH_3)SiCo(CO)_4$. First scan shows one irreversible wave assigned to SiCo(-

The cyclic voltammetry of a $Cl_2CH_3SiCo(CO)_4$ treated ITO electrode shows one irreversible oxidation wave ($E_{pa}$=0.5 vs. Ag), FIG. 2B, at a potential similar to the small irreversible wave observed in FIG. 2A. Similar results are observed for $Cl_3SiCo(CO)_4$ surfaces. Significantly, compounds 1-5 will not react with $SiCo(CO)_4$ modified surfaces after electrochemical oxidation. Presumably, the electrochemically irreversible processes observed in FIGS. 2A and 2B are due to the oxidation of $SiCo(CO)_4$ species and are responsible for the removal of potential surface modification sites. In FIG. 2A, a comparison between the current associated with Co and ferrocene(Fc) oxidation, $I_{Fc}/I_{Co}$=99:1 reveals that approximately 1% of the cobalt surface sites remain unreacted after treatment with the ferrocenyl methanol solution.

Cyclic voltammograms similar to the one depicted in FIG. 2A may be recorded for compounds 2-5 adsorbed onto ITO in a similar fashion. The electrochemical response for assemblies formed from 2-5 via this method are also persistent and stable to the conditions employed. (Cyclic voltammetry experiments were performed in acetonitrile with TBAPF₆(0.10M) as the supporting electrolyte. Modified electrodes were subjected to continuous cycling at various scan rates (1000,800,500,300,200, and 100mV/sec). Compounds 1 and 4 are presumably attached to the surface via Si-O covalent bonds formed from the metathesis of the $SiCo(CO)_4$ unit and an O-H bond. Likewise compounds 2 and 5 must be anchored to the surface via Si-N covalent bonds formed from the metathesis of the Si-Co(CO)₄ unit with the N-H bonds of 2 and 5, respectively. The surface $SiCo(CO)_4$ sites might be reacting with one of two acidic H sites on compound 3, either the S-H bond or one of the C-H bonds α to the carbonyl group. However, solution and surface-bound $Cl_3SiCo(CO)_4$ do not react with acetylferrocene, a molecule that possesses acyl functionality but not thiol functionality, indicating that the mode of modification for 3 is most likely through a Si-S bond. The reaction between 3 and the (CO)₄Co-Si modified surface is particularly interesting since thiols are commonly used to modify noble metal surfaces (Pt, Au, Ni, Ag). a) Mirkin, C. A., et al., in "Chemically Sensitive Microelectrochemical Devices: New Approaches to Sensors," Edelman, P. G., Wang, J., Eds., ACS Symposium Series 487; American Chemical Society: Washington, D.C. (1992), Chapter 17; b) Hickman, J. J., et al., *Science* 252:688 (1991); Porter, M. D., et al., *J. Amer. Chem. Soc.* 109:3559 (1987); Finklea, H. O., et al., *Langmuir* 6:371 (1990); Rubenstein, I., et al., *Nature* 332:426 (1990); Bain, C. D., et al., *J. Amer. Chem. Soc.* 111:321 (1989); Nuzzo, R. G., et al., *J. Amer. Chem. Soc.* 112:558 (1990); Chidsey, C. E. D., et al., *J. Chem Phys.* 91:4421 (1989); Strong, L., et al., *Langmuir* 4:546 (1988); Bain, C. D., et al., *J. Amer. Chem. Soc.* 111:7155 (1989). With the chemistry reported herein, thiols may now be used as a universal functional group for noble metal and oxide electrode surface modification.

It is interesting to note that compounds 1 and 2 will also react slowly and inefficiently (several days) at room temperature with a $Cl_3Si-H$ treated ITO electrode (0.3 cm$^2$) to yield submonolayer coverages of these redox reagents. The films formed from these methods tend to be less durable than films formed from the $SiCo(CO)_4$ modified surfaces. However, if $Co_2(CO)_8$ (0.1 mg) is introduced into the modification reagent solution, full monolayer coverage of the redox reagent is found after 48 hours of soaking. Apparently, the $Co_2(CO)_8$ mediates the surface modification by reacting with the surface S-H sites to form $SiCo(CO)_4$ sites and $(CO)_4CoH$.

It should be possible to extend the $SiCo(CO)_4$ mediated modification of ITO surfaces to other oxide electrodes and high surface area supports such as $Al_2O_3$ and $SiO_2$. Although fairly simple redox active molecules are the focus of this application, in principle any molecule that possesses alcohol, amine, thiol, amide, and carboxylic acid functionality may be adsorbed onto oxide surfaces using this technique.

EXAMPLE 1

A.) Surface preparation. A 0.5 cm$^2$ indium-tin-oxide (ITO) electrode is soaked in 0.5M KOH (or NaOH) solution in ethanol/water (1:1) for 1 hour. The substrate is then rinsed with hot distilled water and ethanol before being dried under vaccuum (approximately 0.25 Torr). The hydrophilicity of the substrate may be tested qualitatively by examining the interaction of water with the ITO substrate. Before treatment with base, the ITO is hydrophobic and water beads on the surface of the ITO. After treatment with base, the water lays on the surface indicating a hydrophilic surface. Quartz and glass ($SiO_2$) substrates as well as oxidized silicon wafers may be treated in a similar manner to yield hydrophilic surfaces susceptible to further modification.

B.) Modification of oxide substrates with $Cl_3SiCo(CO)_4$. Base treated oxide substrate (prepared via the method described in A) is soaked in a 0.1M solution of $Cl_3SiCo(CO)_4$ for 24 hours at 22° C. under an $N_2$ atmosphere. The substrate is then rinsed with 50 mL aliquots of toluene, $CH_2Cl_2$, and $CH_3CN$, respectively. The electrochemical response of ITO treated in such a manner is consistent with monolayer coverage of the Co reagent. ITO treated with $Cl_2(CH_3)SiCo(CO)_4$ and $Cl(CH_3)_2SiCo(CO)_4$ yield surfaces that give similar electrochemical responses. For nonconducting surfaces such as quartz and glass, UV-vis spectroscopy and x-ray photoelectron spectroscopy (XPS) were used to verify the presence of $SiCo(CO)_4$ surfaces sites. The UV-vis spectra of quartz and glass modified with $Cl_3SiCo(CO)_4$ exhibit a broad band at 344 nm. All oxide substrates treated with the $Cl_{3-x}(CH_3)_xSiCo(CO)_4$ (x=0, 1, 2) show Co signals in their x-ray photoelectron spectroscopy spectra.

C.) Further modification of the $Cl_{3-x}(CH_3)_xSiCo(CO)_4$ treated ITO with redox active molecules. The $Cl_3SiCo(CO)_4$-modified ITO (prepared via the method in section B) is soaked in 0.01M acetonitrile solution of ferrocenyl methanol ($FcCH_2OH$) for two days at room temperature. The substrate is then rinsed with 50 mL aliquots of $CH_3CN$ and $CH_2Cl_2$. An ITO electrode treated in this manner yields an electrochemical response consistent with monolayer coverage ($-6 \times 10^{13}$ molecules/cm$^2$). Similar responses are observed for $Cl_2(CH_3)SiCo(CO)_4$- and $Cl(CH_3)_2SiCo(CO)_4$-treated ITO after exposure to the ferrocenyl methanol reagent.

Other redox active molecules that have been used to modify $Cl_3SiCo(CO)_4$-treated ITO via the method described above include: $FcC(O)(CH_2)_{10}SH$ ($5 \times 10^{13}$ molecules/cm$^2$), p-$Fc(C_6H_4NH_2)$ ($4 \times 10^{13}$ molecules/cm$^2$), $FcC(O)OH$ ($7 \times 10^{13}$ molecules/cm$^2$), and $FcC(O)NH_2$ ($4 \times 10^{13}$ molecules/cm$^2$) in a similar manner. Additionally, the compounds: p—Ph—N=N—Ph—(CH$_2$)$_4$OH, p—Ph—N=N—Ph—(CH$_2$)$_4$SH, p,p—FcPh—N=N—Ph(CH$_2$)$_4$OH, +p,p—Fc-Ph—N=N—Ph—(CH$_2$)$_4$SH have been used to modify $Cl_3SiCo(Co)_4$ treated ITO substrates.

Although the invention has been described primarily in connection with special and preferred embodiments, it will be understood that it is capable of modification without departing from the scope of the invention. The following claims are intended to cover all variations, uses, or adaptations of theinvention, following, in general, the principles thereof and including such departures from the present disclosure as come within known or customary practice in the field to which the invention pertains, or as are obvious to persons skilled in the field.

We claim:

1. A composition of matter comprising an inorganic oxide substrate having surface oxygens bonded to silyl-cobalt tetracarbonyl groups.

2. The composition of claim 1 wherein said inorganic oxide is indium-tin-oxide.

3. The composition of claim 1 wherein said substrate is selected from the group consisting of indium-tin-oxide, $SiO_2$, $TiO_2$, $Al_2O_3$, $RuO_2$, $SnO_2$, $GeO_2$, $AuO$, $NiO$, quartz, glass and oxidized silicon wafers.

* * * * *